Nov. 24, 1936.　　　W. NANFELDT　　　2,061,919
BRAKE LINING
Original Filed Oct. 31, 1931
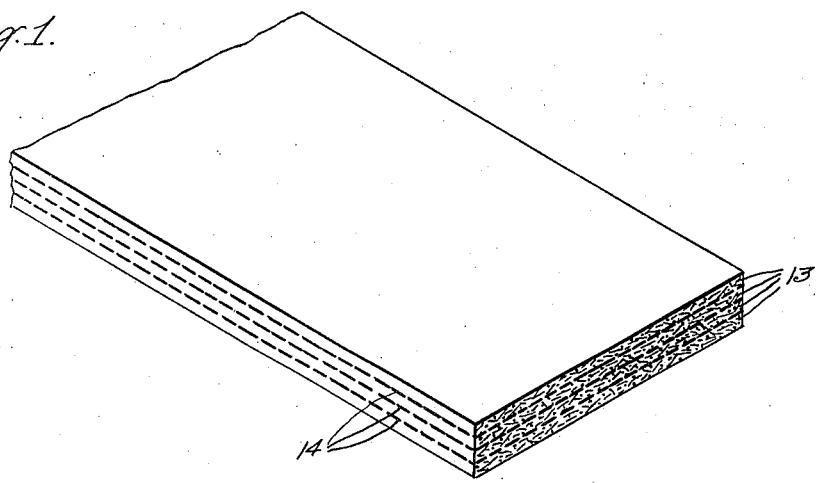
Fig. 1.
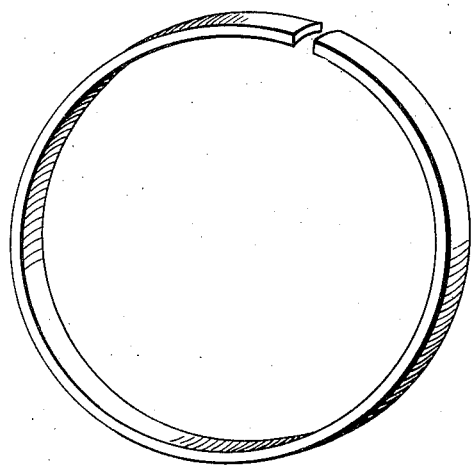
Fig. 2.
Fig. 3.
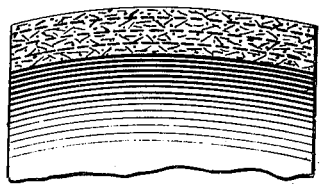
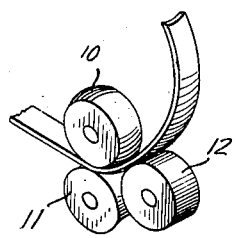
Fig. 4.
INVENTOR
WILLIAM NANFELDT
BY　ATTORNEY
Chester H Bracelton Patented Nov. 24, 1936

2,061,919

UNITED STATES PATENT OFFICE 2,061,919

BRAKE LINING

William Nanfeldt, Clifton, N. J., assignor to World Bestos Corporation, Paterson, N. J., a corporation of Delaware Application October 31, 1931, Serial No. 572,345
Renewed April 22, 1936

9 Claims. (Cl. 154—52)

This invention relates to molded brake lining and other fibre containing products. The invention is directed toward a product particularly suitable for brake band purposes which possesses a hardness and durability of the molded product while at the same time it has flexibility sufficient to permit application on brake drums of varying diameter.

Heretofore, brake lining of the molded type has usually had the disadvantage of being inelastic so that its manufacture necessitated curving the brake lining to fit the brake band of the particular automobile for which the brake band was intended. This necessitated also that the jobber and dealer keep on hand in stock a multiplicity of different sizes and shapes of brake band, requiring a greater outlay of capital and involving various difficulties in handling and distribution.

One of the important objects of the present invention is to provide a molded type of brake lining, which possesses sufficient flexibility to permit shipping in rolls and cutting to fit brake bands of various different curvatures, and which at the same time possesses a high degree of hardness and durability as compared with other standard commercial types of brake lining.

Another object also, is to provide a lining which possesses the advantages of laminated structure without having physical separation of the laminations.

Another object is to provide a brake lining which will not fracture normally through its complete mass, but will fracture in sections of the thickness. Still another object is to provide a brake band lining containing asbestos fibre and rubber in which the asbestos fibre is generally parallel to the plane of the surface strip and in layers through the strip.

Another object of the invention is to provide a type of molded brake lining which when adjusted to a brake shoe, will lie flat, thus permitting a uniform contact on the brake drum throughout the contacting surface area of the strip. The above and other objects are accomplished by the friction material hereinafter described in detail and referred to in the accompanying drawing in which Fig. 1 is a perspective of a section of a friction fabric;

Fig. 2 is a perspective of a friction material in strip form curved for application to a brake shoe or drum;

Fig. 3 is a section through the strip of Fig. 2; and

Fig. 4 is a detail showing the manipulation of the friction strip to bring about a transverse curvature of the same.

As hereinabove stated, this invention has particular utility when employed in the formation of products such as frictional brake lining which contain fibre such as asbestos. In my copending applications, Serial No. 429,922, filed February 20, 1930, and Serial No. 512,892 filed February 2, 1931, I have described compositions containing rubber and asbestos, which may be molded into satisfactory brake lining. As stated in these applications, more particularly in application Serial No. 512,892, of which this application is a continuation in part, I prefer to use the following ingredients in the percentage ranges by weight of the completed composition as follows:

| | Per cent |
|---|---|
| Asbestos | 30 to 60 |
| Rubber | 10 to 20 |
| Sulphur | 5 to 10 |

I also utilize in conjunction with the above ingredients, the following materials in varying proportions:

| | Per cent |
|---|---|
| Graphite | 1 to 6 |
| Litharge | 1 to 10 |
| Iron oxide | 1 to 5 |
| Kaolin | 1 to 25 |

A satisfactory composition contains percentages by weight of the completed composition as follows:

| | Per cent |
|---|---|
| Asbestos fibre | 45 |
| Rubber | 18 |
| Sulphur | 9 |
| Magnesium oxide | 3.6 |
| Graphite | 6 |
| Litharge | 6 |
| Iron oxide | 3 |
| Kaolin | 9.1 |

The composition containing these ingredients is prepared according to either process described in the copending applications mentioned, but I prefer the method described in my copending application, Serial No. 512,892.

According to this latter method, crude smoked rubber sheets are macerated between oppositely traveling rolls in a roll mill, and simultaneously combined with certain cure accelerators, such as magnesium oxide (MgO) and litharge in the proportions hereinabove mentioned. Sulphur is also added to bring about vulcanization in a later step in the process.

The macerated rubber is then placed in thin sheet form, the sheets having a thickness preferably less than one-thirty second of an inch, four or five thousandths being as satisfactory. This sheet of rubber mixture is then placed in a masticator or mixing machine of the impact type having rotating blades or impact members which constantly carry around and agitate the contents of the material. To the rubber is added a rubber solvent, such as gasoline, benzol, solvent naphtha, etc., the weight of the solvent being approximately that of the batch of material.

The rubber and solvent are mixed for approximately half an hour, or until the rubber becomes a cement, and asbestos fibre in the proportions above stated is then added and mixing continued until individual fibres of the asbestos are coated with the cement. This step is important as the rubber acts as a protective coating for the asbestos. After about half an hour when the asbestos has been thoroughly coated, rubber latex is added in amounts varying from 1% to 75% of the predetermined quantity of rubber to be used in the completed composition. The latex is mixed with the coated asbestos until it is absorbed in the mixture. Then the final filler, lubrication, and cure elements are added such as iron oxide ($Fe_2O_3$), graphite, and kaolin, and these elements thoroughly stirred and mixed into the batch until a homogeneous mixture is obtained.

The mix is now transferred to a second roll mill which may have one roller corrugated and which serves to further macerate and rend the material, and also to crush all small masses or balls of the mixed material so that a smooth, uniform and homogeneous stock is finally obtained suitable for insertion in the extruder or for any other purpose for which a moldable composition may be used.

In utilizing the composition as has been described hereinabove, the material is placed in a hydraulic press of suitable form which is provided with a nozzle or outlet with a flat mouth so that the extruded material as it emerges from the mouth is approximately in the strip form desired with such excess dimensions as will allow for shrinkage in the curing operation as well as for grinding operations which may be necessary to properly smooth the surface of the material.

As described in my copending application Serial No. 512,892, the extruding apparatus is provided with a screening plate adjacent its outlet to remove foreign material and to align the fibres of the asbestos where asbestos is employed. The nozzle of the extruder is also provided with partitions, the faces of which are parallel to the flat side of the strip and serve to divide the strip into a plurality of flat sheets which later recombine, and the material subsequently emerging as a single undivided layer. This temporary division in the nozzle removes the fibre from the internal surfaces where recombination of the strips is made and in the completed product enhances the flexibility of the brake lining.

After emergence from the extruder, the material in strip form is passed through a drying oven of standard form including an enclosure in which heat is applied to cause evaporation of the solvent.

An important advantage of the use of latex becomes evident in this drying operation inasmuch as the water content of the latex is disseminated all through the preliminary brake band strip, and in the presence of heat, the expanding water and vapor brings about a porosity which accelerates the drying operation. Where water is not present as is the case where crude rubber alone is used in the preparation of the composition, the surface of the strip when dried first forms a hard and impervious skin layer which effectively hinders evaporation of the solvent from the interior of the strip, and thus very materially increases the time necessary for removing the solvent. By using rubber latex composition, the drying time is reduced over 50%, the actual reduction being from four to five hours to one to two hours. While the use of an enclosed oven with the application of artificial heat is preferable as hastening the drying operation, it would be feasible to dry the strip in the open air provided the humidity and temperature conditions were suitable.

From the drying oven the strip is conveyed to a calendering or forming roll preferably of the type where one roll has projecting rims or edges while the other roll is without rims, the second roll compressing the material between the rims of the first roll.

After the rolling operation which perceptibly diminishes the thickness of the strip, the strip is then subjected to an edge grinding operation. This is done by standard equipment such as two opposed flat plates coated with friction material and rotating in opposite directions. The edges of the strip are, by this means, rendered smooth and all dried and wrinkled portions removed.

The strip is then ready for the vulcanizing step. This may be accomplished in various ways but a satisfactory method is the use of the well known flat press consisting of a channeled surface in which the strip material is adapted to be inserted and a press element adapted to fit in the channels over the strip to compress the same, preferably to pressures of approximately 1500 lbs. per square inch. This pressure is ordinarily applied for fifteen minutes while the press is being maintained at a temperature of 325° F. Vulcanization occurs under these conditions of heat and pressure, leaving the substance in a rigid condition with a hard surface skin.

In order to place this rigid strip in condition for brake lining or other frictional purposes and impart a good degree of flexibility to it, it is necessary that one face at least of the cured brake lining be removed, and this may be done by an ordinary grinding wheel having an abrasive surface with suitable guiding wheels or pulleys to maintain the material in position. By this means irregularities in the dimensions of the strip are removed.

A final operation employed in the treatment of this brake lining in order to insure the necessary flexibility consists in passing the strip through rollers 10, 11 and 12. The roller 10 has a surface which is convex in axial section; the roller 11 has a surface which is concave in axial section, while the roller 12 is straight in axial section. It is apparent, therefore, that when the strip is passed about the convex roller 10 that it will receive a slight curvature, giving the product a slight bevel or crown on its outer surface. The flexing of the material also serves to loosen the fibre and give the completed product a maximum of flexibility without in any way modifying the intrinsic hardness of the substance. The crown on the surface of the strip makes it possible to adjust the strip when used as a brake lining, to various diameters of brake shoes so that when secured in position the lining lies flat rather than curved as would be the case when the lining is made flat and then curved to fit the brake shoe. Consequently the transverse curvature of the lining as above described insures a true flat surface of application to the brake drum.

The inherent flexibility of the brake band results from its layer construction, which through causing a horizontal positioning of the fibrous stock of the material, tends to permit more readily a lateral movement of the lining. This advantageous characteristic of the completed brake band is brought out in Fig. 1, where the various layers or laminations are indicated by the numeral 13 and as separated by imaginary planes 14. While, of course, there is no separate movement of these individual layers of material in the brake lining, in each layer the fibres are more or less parallel to the surface of the brake band and hence will not tend to restrain a lateral flexing of the band.

Another feature of the invention as brought about by the layer construction, will be apparent on consideration of the fact that lumps or balls of the stock cannot exceed in the finished product the width of an individual layer. Hence, when the band is subjected to a sharp bending movement, there can be no point of weakness in the band induced by the presence of a ball or lump of conglomerated material. Should any small lumps of the material enter into the finished product, a fracture of the band resulting therefrom would extend only to one layer.

Because of the flexibility of the brake band brought about by its layer construction and by its subsequent treatment to edge grinding and surfacing, it is possible for the manufacturer to ship the lining in roll form directly to the jobber or dealer, who may then cut the lining to length and fit it to a brake drum of any make of automobile having diverse curvatures. This is an advantage of highest importance, resulting from the invention.

In addition to the flexibility arising from the laminated construction, the hardness and durability of the lining is augmented. Brinell hardness tests on the lining surface give a reading of eight-thousandths of an inch with a three-quarter inch (¾″) slug, using a pressure of 3000 kilograms as compared to twelve to fifteen thousandths for competitive linings.

While I have described in general terms the process for making friction material, it is of course understood that various alterations may be employed in the steps involved. Instead of a press, I may, for example, grind more than one surface of the curved strip. I may also modify the fibrous stock which may be either vegetable or mineral including cotton, wool, hemp, shredded leather, etc. although the invention has special utility in the formation of brake band lining from a moldable composition containing asbestos.

Various other modifications of the invention as disclosed may be made, and therefore, I do not wish to be restricted except as required by the claims hereto appended.

Having thus described my invention what I desire to claim is:

1. A molded brake lining containing asbestos fibre and a homogeneous bonding agent, there being planes within said lining parallel to a surface plane thereof through which asbestos fibres do not extend transversely.

2. A molded brake lining consisting of asbestos fibre and other filler and binding substances, the asbestos fibre lying in separate layers in said lining and in similar alignment.

3. A brake band lining consisting of a plurality of separated layers of asbestos-containing material and bonding material substantially free of asbestos fibres in which said layers are embedded, said lining being curved in transverse section.

4. A brake band lining comprising a plurality of separated layers of asbestos-containing material and bonding material substantially free of asbestos fibres in which said layers are embedded, said lining having opposite surfaces each having approximately the same transverse curvature as the other.

5. A curvilinear brake band lining consisting of a plurality of separated layers of asbestos-containing material and bonding material substantially free of asbestos fibres in which said layers are embedded, said surface curving outwardly from the edges thereof, relative to the center of curvature of the lining.

6. A brake lining formed of a molded product, said lining being in strip form, one of the main surfaces of said strip being ground smooth and curvilinear in transverse section.

7. A brake band consisting of a strip of homogeneous body material and material containing fibrous stock positioned in layer formation in said body material, the fibres of said stock being positioned in general in planes approximately parallel to the surfaces of said layers.

8. A brake band consisting of a strip of homogeneous body material and material containing fibrous stock positioned in layer formation in said body material, the fibrous stock of each layer being confined to said layer and lying approximately parallel to the surfaces of the layers.

9. A brake band consisting of a strip of homogeneous body material and material containing fibrous stock positioned in layer formation in said body material, said fibres being aligned approximately parallel to the layer surface.

WILLIAM NANFELDT.